United States Patent
Cai et al.

(10) Patent No.: US 10,691,247 B2
(45) Date of Patent: Jun. 23, 2020

(54) DISPLAY PANEL HAVING PRESSURE DETECTING IN GATE DRIVING CIRCUIT AND ELECTRONIC DEVICE THEREOF

(71) Applicant: Xiamen Tianma Micro-Electronics Co., Ltd., Xiamen (CN)

(72) Inventors: Xuanxian Cai, Xiamen (CN); Bozhi Liu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/904,059

(22) Filed: Feb. 23, 2018

(65) Prior Publication Data

US 2018/0188877 A1    Jul. 5, 2018

(30) Foreign Application Priority Data

Sep. 25, 2017    (CN) .......................... 2017 1 0876671

(51) Int. Cl.
| | |
|---|---|
| *G06F 3/041* | (2006.01) |
| *G09G 3/20* | (2006.01) |
| *G09G 3/3208* | (2016.01) |
| *G09G 3/36* | (2006.01) |
| *G09G 3/3266* | (2016.01) |

(52) U.S. Cl.
CPC .......... *G06F 3/0414* (2013.01); *G06F 3/0412* (2013.01); *G09G 3/2092* (2013.01); *G09G 3/3208* (2013.01); *G09G 3/3266* (2013.01); *G09G 3/3611* (2013.01); *G09G 3/3677* (2013.01); *G09G 2300/0426* (2013.01); *G09G 2310/0286* (2013.01)

(58) Field of Classification Search
CPC ...................................................... G06F 3/0414
USPC .................................................. 345/173, 100
See application file for complete search history.

(56) References Cited

U.S. PATENT DOCUMENTS

2017/0003811 A1* 1/2017 Lu .......................... G06F 3/0416

FOREIGN PATENT DOCUMENTS

CN            105867699 A        8/2016

* cited by examiner

*Primary Examiner* — Long D Pham
(74) *Attorney, Agent, or Firm* — Alston & Bird LLP

(57) ABSTRACT

Provided are a display panel and an electronic device, and the display panel includes: shift registers, pressure detecting units and switching circuits; the switching circuit includes a first switching transistor and a second switching transistor, and a control terminal of the first switching transistor is electrically connected with an outputting terminal of one of the shift registers and an inputting terminal of the first switching transistor is electrically connected to a first outputting terminal of the corresponding pressure detecting unit, and a control terminal of the second switching transistor is electrically connected to an outputting terminal of one of the shift registers and an inputting terminal of the second switching transistor is electrically connected to a second outputting terminal of corresponding pressure detecting unit.

15 Claims, 15 Drawing Sheets

DISPLAY PANEL HAVING PRESSURE DETECTING IN GATE DRIVING CIRCUIT AND ELECTRONIC DEVICE THEREOF

CROSS-REFERENCE TO RELATED APPLICATIONS

This application claims priority to Chinese patent application No. 201710876671.8 filed on Sep. 25, 2017, the disclosure of which is incorporated herein by reference in its entirety.

TECHNICAL FIELD

The present disclosure relates to display technologies, in particular to a display panel and an electronic device.

BACKGROUND

With the fast development of the portable electronic terminal devices, especially mobile phones and tablet computers, more and more new technologies are applied in these electronic terminal devices. At present, a pressure-sensing touch technology is a new technology which attracted more and more attentions in industries, and the touch screen with the pressure-sensing touch technology may accurately identify a difference between a point touch operation and a pressing operation.

When the user presses the screen, the touch screen integrated with a pressure sensor may accurately determine the pressure applied on the surface of the touch screen by the user, and hence different operations may be achieved. For example, more control options may be invoked in the applications such as information, music and calendar etc.

The conventional pressure sensor is commonly disposed around the display screen, and is configured to detect whether the display screen is applied a pressure and the magnitude of the pressure. However, two outputting wires and two inputting wires are extended from each of the pressure sensors, and may occupy the frame area of the display screen, which is not favorable for the narrow frame of the display screen.

SUMMARY

The present disclosure provides a display panel and an electronic device so as to achieve a narrow frame.

In a first aspect, the present disclosure provides a display panel, and the display panel includes: multiple shift registers cascaded sequentially; a plurality of pressure detecting units; and at least one switching circuit and at least one outputting wire.

Each of the at least one switching circuit is electrically connected to corresponding one of the pressure detecting units; and the at least one switching circuit includes a first switching transistor and a second switching transistor, a control terminal of the first switching transistor is electrically connected to an outputting terminal of one of the shift registers, and an inputting terminal of the first switching transistor is electrically connected to a first outputting terminal of a corresponding pressure detecting unit. A control terminal of the second switching transistor is electrically connected to an outputting terminal of another one of the shift registers, and an inputting terminal of the second switching transistor is electrically connected to a second outputting terminal of the corresponding pressure detecting unit. The shift register electrically connected with the control terminal of the first switching transistor is different from the other shift register electrically connected with the control terminal of the second switching transistor, and the outputting terminal of the first switching transistor and the outputting terminal of the second switching transistor are electrically connected to one of the at least one outputting wire.

In a second aspect, the present disclosure further provides a display panel, and the display panel includes: multiple shift registers cascaded sequentially; a plurality of pressure detecting units; and at least two switching circuits and at least one first outputting wire, wherein the at least one switching circuit is electrically connected to one of the plurality of pressure detecting units.

The at least one switching circuit includes a first switching transistor, a control terminal of the first switching transistor is electrically connected with an outputting terminal of one of the shift registers, an inputting terminal of the first switching transistor is electrically connected to a first outputting terminal of the corresponding pressure detecting unit, and the outputting terminals of at least two of the first switching transistors are electrically connected to one of the at least one first outputting wire.

For two of the first switching transistors electrically connected to one of the at least one first outputting wire, the shift register electrically connected to the control terminal of one of the first switching transistors is different from the other shift register electrically connected to the control terminal of another one of the first switching transistors.

In a third aspect, the present disclosure further provides an electronic device, and the electronic device includes the above mentioned display panel.

At least one switching circuit is disposed in the display panel provided by the present disclosure, the at least one switching circuit includes a first switching transistor and a second switching transistor, and the control terminals of the first switching transistor and the second switching transistor in the at least one switching circuit are electrically connected to one of the at least one outputting wire. The inputting terminal of the first switching transistor is electrically connected to the first outputting terminal of the corresponding pressure detecting unit, the inputting terminal of the second switching transistor is electrically connected to the second outputting terminal of the pressure detecting unit, and the shift register electrically connected with the control terminal of the first switching transistor is different from the other shift register electrically connected with the control terminal of the second switching transistor. Apparently, in this embodiment, the first outputting terminal and the second outputting terminal in one of the pressure detecting units electrically connected to the corresponding switching circuit may share one outputting wire. Therefore, the number of the outputting wires extended from the pressure detecting unit may be decreased, and hence decreasing the occupied area of the non-display region of the display panel by the wirings of the pressure detecting unit, which is favorable to achieve the narrow frame.

BRIEF DESCRIPTION OF DRAWINGS

In order to make a clear description for the technical solutions in the present disclosure, a simple description about the drawings employed in the embodiments of the present disclosure is given below. Apparently, the drawings stated herein are some embodiments of the present disclosure and other drawings may be achieved on the basis of the drawings here by those skilled in the art without creative works.

DETAILED DESCRIPTION

In order to make the objects, technical solution and advantages of the present disclosure more clear, the present disclosure is further described below in combination with the drawings, and through the specific embodiments, the technical solution of the present disclosure is clearly and fully described. Apparently, the embodiments stated herein are merely a part of structures related to the present disclosure rather than the whole structure, other embodiments achieved by those skilled in the art without creative works may fall into the scope of protection in the present.

Figure 1:
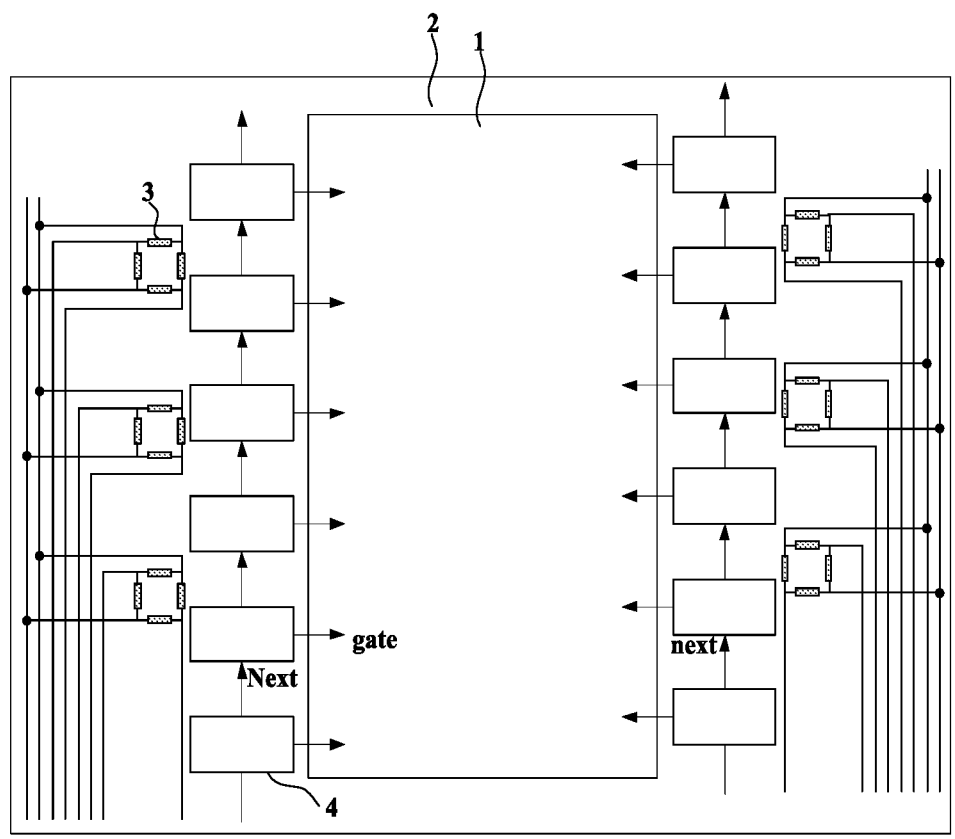
FIG. 1 is a diagram showing a display panel in the related art.

Referring to FIG. 1, FIG. 1 is a diagram showing a display panel according to the conventional technology. The display panel provided by the conventional technology includes: a display region 1, a non-display region 2 surrounding the display region 1, pressure sensors 3 and shift registers 4. In order to avoid the affections on the display effects of the display panel by the pressure sensor 3, the pressure sensors 3 are disposed in the non-display region 2, and are configured to detect whether the display screen is applied a pressure and also the magnitude of the pressure. Two outputting wires and two inputting wires are extended from each of the pressure sensors, so that these wires may occupy the area of the non-display region 2 of the display panel, which is not favorable for the narrow frame of the display screen.

Figure 2:
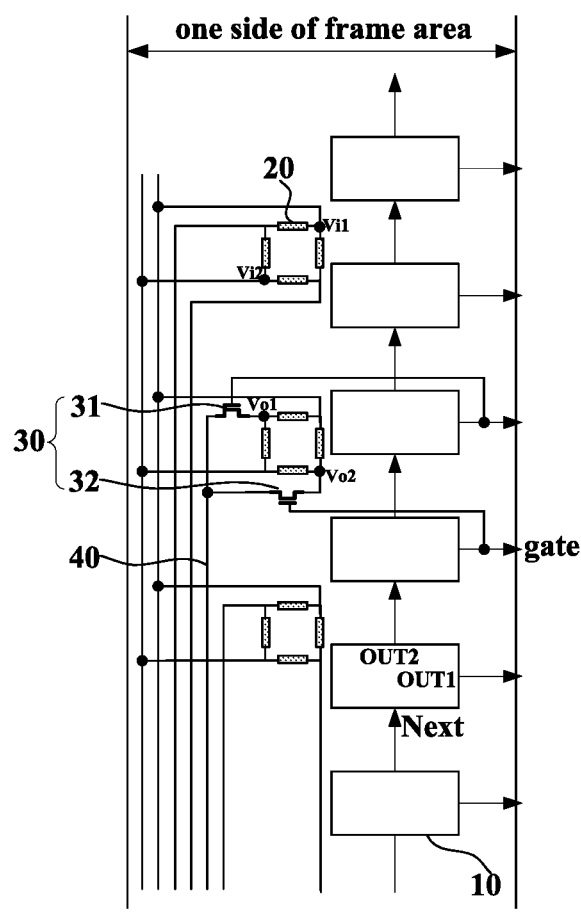
FIG. 2 is a diagram showing a display panel according to an embodiment of the present disclosure.
Figure 3:
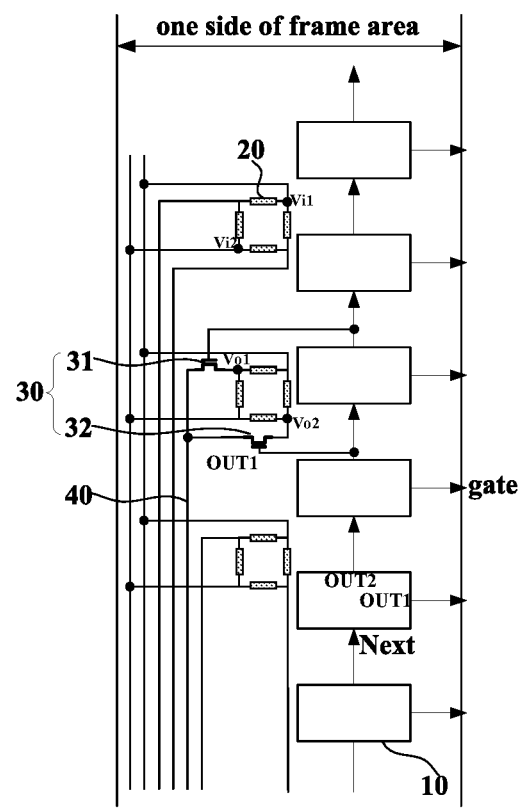
FIG. 3 is a diagram showing a display panel according to an embodiment of the present disclosure.
Figure 4:
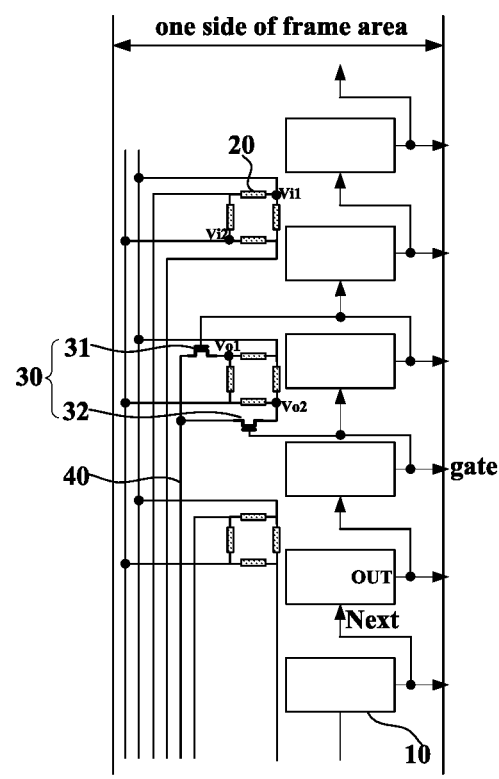
FIG. 4 is a diagram showing a display panel according to an embodiment of the present disclosure.

In order to solve the problems in the related art, the present disclosure provides a display panel. Referring to FIG. 2, FIG. 3 and FIG. 4, FIG. 2, FIG. 3 and FIG. 4 are diagrams showing a display panel according to the embodiments of the present disclosure. The display panel provided by the embodiments of the present disclosure includes: multiple shift registers 10 cascaded sequentially; a plurality of pressure detecting units 20; and at least one switching circuit 30 and at least one outputting wire 40. Each of the at least one switching circuit 30 is electrically connected to corresponding one of the pressure detecting units 20; and the at least one switching circuit 30 includes a first switching transistor 31 and a second switching transistor 32, a control terminal of the first switching transistor 31 is electrically connected to an outputting terminal of one of the shift registers 10, and an inputting terminal of the first switching transistor 31 is electrically connected to a first outputting terminal of a corresponding pressure detecting unit 20. A control terminal of the second switching transistor 32 is electrically connected to an outputting terminal of another one of the shift registers 10, and an inputting terminal of the second switching transistor 32 is electrically connected to a second outputting terminal Vo2 of the corresponding pressure detecting unit 20. The shift register 10 electrically connected with the control terminal of the first switching transistor 31 is different from the other shift register 10 electrically connected with the control terminal of the second switching transistor 32, and the outputting terminal of the first switching transistor 31 and the outputting terminal of the second switching transistor 32 in the at least one switching circuit 30 are electrically connected to one of the at least one outputting wire 40. The display panel shown in FIG. 2 may include a plurality of the pressure detecting units 20 and a switching circuit 30. Only one side of the frame region of the display panel is shown here (i.e., a part of the non-display region) and the region of the display panel are not completely shown.

Detailed descriptions are given as follows by taking the display panels shown in FIG. 2, FIG. 3 and FIG. 4 as examples.

In this embodiment, the switching circuit 30 includes a first switching transistor 31. A control terminal of the first switching transistor 31 is electrically connected with an outputting terminal of one of the shift registers 10, and the shift registers 10 electrically connected to the first switching transistor 31 may be reused as a control component to control turning on and turning off of the first switching transistor 31. An inputting terminal of the first switching transistor 31 is electrically connected to a first outputting terminal Vo1 of the corresponding pressure detecting unit 20. When a signal outputted from the outputting terminal in one of the shift registers 10 electrically connected to the first switching transistor 31 is used to control turning on of the first switching transistor 31, a pressure detection signal outputted from the first outputting terminal Vo1 of the pressure detecting unit 20 can be transmitted to an outputting wire 40 through the turned-on first switching transistor 31, and hence transmitted to a drive IC (not shown). When the signal outputted from the outputting terminal in one of the shift registers 10 electrically connected to the first switching transistor 31, is used to control turning off of the first switching transistor 31, a pressure detection signal outputted from the first outputting terminal Vo1 of the pressure detecting unit 20 cannot be transmitted to the outputting wire 40.

In this embodiment, the switching circuit 30 further includes a second switching transistor 32. A control terminal of the second switching transistor 32 is electrically connected to an outputting terminal of one of the shift registers 10, and one of the shift registers 10 electrically connected to the second switching transistor 32, may be reused as a control component to control turning on and turning off of the second switching transistor 32. An inputting terminal of the second switching transistor 32 is electrically connected to a second outputting terminal Vo2 of the corresponding pressure detecting unit 20. When a signal outputted from the outputting terminal in one of the shift registers 10 electrically connected to the second switching transistor 32, is used to control turning on of the second switching transistor 32, a pressure detection signal outputted from the second outputting terminal Vo2 of the pressure detecting unit 20 can be transmitted to an outputting wire 40 through the turned-on second switching transistor 32, and hence transmitted to a drive IC (not shown). When the signal outputted from the outputting terminal in one of the shift registers 10 which electrically connected to the second switching transistor 32, is used to control turning off of the second switching transistor 32, a pressure detection signal outputted from the second outputting terminal Vo2 of the pressure detecting unit 20 cannot be transmitted to the outputting wire 40.

In this embodiment, for the at least one switching circuit 30, one of the shift registers 10 electrically connected with the control terminal of the first switching transistor 31, is different from one of the shift registers 10 electrically connected with the control terminal of the second switching transistor 32, and the outputting terminal of the first switching transistor 31 and the outputting terminal of the second switching transistor 32 are in the at least one switching circuit 30 electrically connected to one outputting wire 40. Therefore, two different shift registers 10 may control turning on of the first switching transistor 31 and turning on of the second switching transistor 32 of the at least one switching circuit 30 in a time-division manner. Specifically, in the switching circuit 30, when the first switching transistor 31 is turned on, the second switching transistor 32 is turned off, and hence a pressure detection signal outputted from the first outputting terminal Vo1 of the pressure detecting unit 20 corresponding to the switching circuit 30 can be transmitted to the drive IC through the turned-on first switching transistor 31 and the outputting wire 40; and when the first switching transistor 31 is turned off, the second switching transistor 32 is turned on, and hence a pressure detection signal outputted from the second outputting terminal Vo2 of the pressure detecting unit 20 corresponding to the switching circuit 30 can be transmitted to the drive IC through the turned-on second switching transistor 32 and the outputting wire 40.

The pressure detecting unit 20 includes a first inputting terminal Vi1, a second inputting terminal Vi2, a first outputting terminal Vo1 and a second outputting terminal Vo2. The first inputting terminal Vi1 of the pressure detecting unit 20 is electrically connected to one of the inputting wires, and the second inputting terminal Vi2 of the pressure detecting unit 20 is electrically connected to the other one of the inputting wires. In this embodiment, for the pressure detecting unit 20 corresponding to the switching circuit 30, the first outputting terminal Vo1 of the pressure detecting unit 20 is electrically connected to an outputting wire 40 through the first switching transistor 31 of the switching circuit 30, and the second outputting terminal Vo2 of the pressure detecting unit 20 is electrically connected to the same outputting wire 40 through the second switching transistor 32 of the switching circuit 30. That is, the outputting wire 40 is shared (i.e., commonly used) by the first outputting terminal Vo1 and the second outputting terminal Vo2 of the pressure detecting unit 20. Therefore, the number of the outputting wires extended from the pressure detecting unit 20 may decreased, that is, only one outputting wire 40 is extended from each of the pressure detecting units 20 connected with the switching circuits 30.

In this embodiment, for the pressure detecting unit 20 connected with the switching circuit 30, in a pressure detecting stage, the voltage signal of the pressure reference power supply is transmitted to the first inputting terminal Vi1 and the second inputting terminal Vi2 of the pressure detecting unit 20, and the pressure detection signal outputted from the first outputting terminal Vo1 of the pressure detecting unit 20 is transmitted to an outputting wire 40 when the first switching transistor 31 is turned on, and the pressure detection signal outputted from the second outputting terminal Vo2 of the pressure detecting unit 20 is transmitted to the same outputting wire 40 when the second switching transistor 32 is turned on. Then, the pressure detection is performed by the drive IC of the display panel based on successively acquired pressure detection signals outputted from the first outputting terminal Vo1 and the second outputting terminal Vo2 of the pressure detecting unit 20. For those pressure detecting units 20 which are not electrically connected to the switching circuits 30, the pressure detecting process and the principle thereof, are similar to those in the related art, and hence no repetitions are made here.

In this embodiment, the shift register 10 may be provided as a scanning shift register of a gate driving circuit. The outputting terminal of the shift register 10 may be configured to output a trigger signal for the next stage of the shift register or output a scan drive signal.

As shown in FIG. 2 and FIG. 3, the shift register 10 includes a first outputting terminal OUT1 and a second outputting terminal OUT2, and the first outputting terminal OUT1 is configured to output a scan drive signal gate and the second outputting terminal OUT2 is configured to output a trigger signal next for the next stage of the shift register, and the scan drive signal gate and the trigger signal next for the next stage of the shift register are both pulse signals; and the scan drive signal gate outputted from the first outputting terminal OUT1 of the shift register 10 is transmitted to the corresponding scanning line, and the trigger signal for the next stage of the shift register which is outputted from second outputting terminal OUT2 of the shift register 10 is transmitted to the next stage of the shift register 10 cascaded with the shift register. Referring to FIG. 2, the control terminal of any of the switching transistors in the switching circuit 30 is electrically connected to the first outputting terminal OUT1 of the shift register 10, and then the scan drive signal gate outputted from the first outputting terminal OUT1 of the shift register 10 is also configured to control turning on and turning off of the corresponding switching transistor electrically connected thereto. Referring to FIG. 3, the control terminal of any of the switching transistors in the switching circuit 30 is electrically connected to the second outputting terminal OUT2 of the shift register 10, and then the trigger signal for the next stage of the shift register which is outputted from the second outputting terminal OUT2 of the shift register 10 is also configured to control turning on and turning off of the corresponding switching transistor electrically connected thereto.

As shown in FIG. 4, the shift register 10 includes an outputting terminal OUT, wherein the signal outputted from the outputting terminal OUT is a pulse signal, and the pulse signal outputted from the outputting terminal OUT may be used as a scan drive signal gate and hence transmitted to the corresponding scanning line. At this time, the pulse signal outputted from the outputting terminal OUT may also be reused as a trigger signal for the next stage of the shift register and hence transmitted to the next stage of cascaded shift register 10. Referring to FIG. 4, the control terminal of any of the switching transistors in the switching circuit 30 is electrically connected to the outputting terminal OUT of the shift register 10, the pulse signal outputted from the outputting terminal OUT of the shift register 10 is also configured to control turning on and turning off of the corresponding switching transistor electrically connected thereto.

It should be noted that, for example, if three pressure detecting units are disposed on a side of the display panel, six outputting wires are needed in the related art. However, only five outputting wires are needed in the display panel as shown in FIG. 2, FIG. 3 and FIG. 4.

In other embodiments, if the display panel is an organic light-emitting display (OLED) panel, the shift register may be a light-emitting shift register of the light-emitting driving circuit of the OLED panel, which is configured to control to emit light. Specifically, the outputting terminal of the shift register is configured to output the light-emitting control signal and the trigger signal for the next stage of the shift register. The light-emitting control signal may also be reused as a control signal to control turning on and turning off of the corresponding switching transistor; and the trigger signal for the next stage of the shift register may also be reused as a control signal to control turning on and turning off of the corresponding switching transistor.

It should be noted that, in this embodiment, for any one of the switching circuits 30, one of the shift registers 10 electrically connected to the first switching transistor 31 of the switching circuit 30 is cascaded with one of the shift registers 10 electrically connected to the second switching transistor 32 of the switching circuit 30. The two of the shift registers 10 cascaded with each other may control the first switching transistor 31 and the second switching transistor 32 of the switching circuit 30 to be successively turned on in a time-division manner. Accordingly, the pressure detection signals are outputted successively from the first outputting terminal Vo1 and the second outputting terminal Vo2 of the corresponding pressure detecting unit 20 via the same outputting wire 40, and hence the display panel successively acquire two pressure detection signals outputted successively from the pressure detecting unit 20 via the outputting wire 40 to perform the pressure detection. In other embodiments, one of the shift registers electrically connected with the first switching transistor of the switching circuit is not directly cascaded with one of the shift registers electrically connected with the second switching transistor of the switching circuit. In this arrangement, any one of the shift registers may be electrically connected to one of the switching transistors under the condition that the drive IC can accurately receive the output signals from the pressure detecting units in a time-division manner.

In this embodiment, the pressure detecting unit 20 may be a metallic bridge-type pressure detecting unit, that is, the pressure detecting unit 20 includes four resistors and the material of each of the resisters is a metallic thin film. In other embodiments, the pressure detecting unit may also be a semiconductor pressure detecting unit, that is, the pressure detecting unit includes a semiconductor film and the semiconductor film may be equivalent to four resistors. In this embodiment, the drive IC (not shown) of the display panel is directly electrically connected to the outputting wire extended from each of the pressure detecting units 20, in order to perform the pressure detection based on the pressure detection signals transmitted in the outputting wire from the pressure detecting unit 20.

Figure 5:
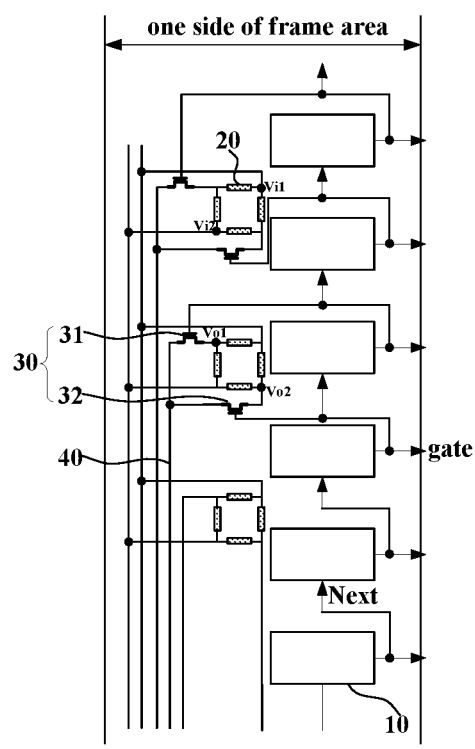
FIG. 5 is a diagram showing a display panel according to an embodiment of the present disclosure.

Referring to FIG. 5, FIG. 5 shows a display panel provided by the present disclosure, the difference between the display panel shown in FIG. 5 and the display panels shown in FIG. 2, FIG. 3 and FIG. 4 lies in that, in the display panel shown in FIG. 5, the display panel may include a plurality of the pressure detecting units 20 and at least two switching circuits 30. It can be seen that each of the at least two switching circuits 30 corresponds to one of the pressure detecting units 20, the first outputting terminal Vo1 and the second outputting terminal Vo2 of one of the pressure detecting units 20 electrically connected to the corresponding switching circuit 30 may share (i.e., commonly use) the outputting wire 40. Therefore, the number of the outputting wires extended from the pressure detecting unit 20 may be decreased, thereby achieving the narrow frame. For example, if three pressure detecting units are disposed on a side of the display panel, six outputting wires are needed in the related art. However, only five outputting wires are needed in the display panel as shown in FIG. 5.

Figure 6:
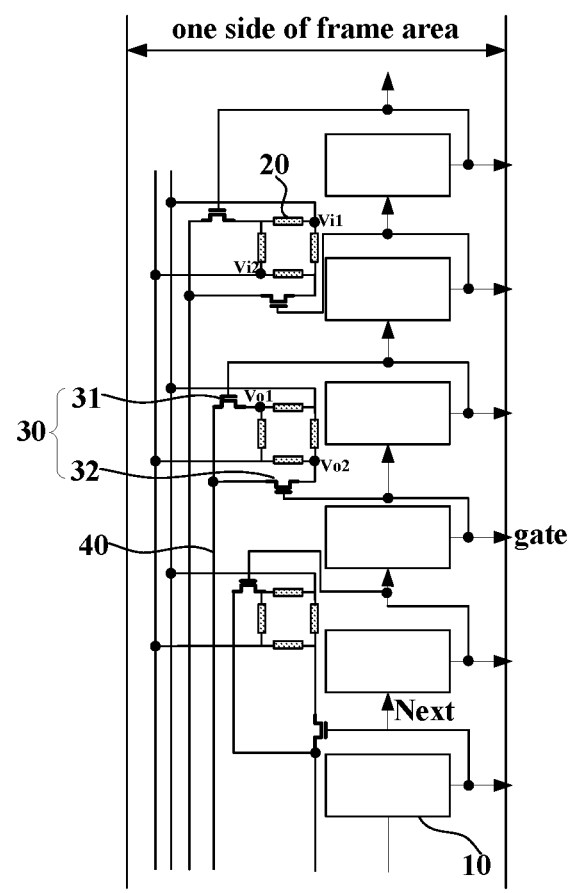
FIG. 6 is a diagram showing a display panel according to an embodiment of the present disclosure.

Referring to FIG. 6, FIG. 6 shows a display panel provided by the embodiment of the present disclosure, the difference between the display panel shown in FIG. 6 and the display panels shown in FIG. 2 to FIG. 5 lies in that, in the display panel shown in FIG. 6, the display panel may include a plurality of switching circuits 30, and each of the plurality of switching circuits 30 is provided correspond to one of the plurality of pressure detecting units 20. It can be seen that each of the pressure detecting units 20 is electrically connected to one of corresponding switching circuits 30, and for each of the pressure detecting units 20 of the display panel, the first outputting terminal Vo1 and the second outputting terminal Vo2 of the pressure detecting unit 20 may share one outputting wire 40. Therefore, the number of the outputting wires extended from the pressure detecting unit 20 may be decreased, thereby achieving the narrow frame. For example, if three pressure detecting units are disposed on a side of the display panel, six outputting wires are needed in the related art. However, only three outputting wires are needed in the display panel as shown in FIG. 6.

For one of above mentioned display panels, the outputting terminal of the shift register 10 is configured to output a trigger signal for the next stage of shift register, a scan drive signal or a light-emitting control signal. The signal outputted from the outputting terminal of the shift register 10 is a pulse signal, and an effective pulse signal may be defined as a high level pulse. For example, a row of thin film transistors (TFTs) are controlled to be turned on when the scan drive signal is a high level pulse signal, and a row of the TFTs are controlled to be turned off when the scan drive signal is a low level pulse signal. When the high level pulse signal acts as an effective pulse signal and the pulse signal outputted from at least one of the shift registers 10 is reused as a control signal to control turning on and turning off of the switching transistor, each of the first switching transistor 31 and the second switching transistor 32 in the switching circuit 30 may be a NMOS. When the low level pulse signal acts as an effective pulse signal and the pulse signal outputted from at least one of the shift registers 10 is reused as a control signal to control turning on and turning off of the switching transistor, each of the first switching transistor 31 and the second switching transistor 32 in the switching circuit 30 may be a PMOS.

As mentioned above, in this embodiment, at least one of the shift registers 10 is reused as a control component of the switching transistors in the switching circuit, so that there is no need to arrange control lines in the non-display region of the display panel to control the switching circuit 30, and hence the area of the non-display region of the display panel will not be occupied; in another aspect, the switching transistors of the switching circuit 30 may be arranged in a stacked manner or other manners with the pressure detecting unit 20, so that the area of the non-display region of the display panel will not be occupied. Based on the above arrangement, the switching circuit 30 is disposed in the display panel provided by the embodiment in such a way that the structure and the wirings of the switching circuit 30 will not occupy the area of the non-display region of the display panel. In this embodiment, the display panel includes a plurality of pressure detecting units 20 and at least one switching circuit 30. Each of the switching circuits 30 correspond to one of the plurality of pressure detecting units 20. The first outputting terminal Vo1 and the second outputting terminal Vo2 of any one of the pressure detecting units 20 electrically connected to the corresponding switching circuit 30 may share the outputting wire 40. Therefore, the number of the outputting wires extended from the pressure detecting unit 20 may be decreased, thereby decreasing the area of the non-display region of the display panel occupied by the wirings of the pressure detecting unit 20, which is favorable to achieve the narrow frame.

At least one switching circuit is disposed in the display panel provided by the present embodiment, and the switching circuit includes a first switching transistor and a second switching transistor, and the control terminals of the first switching transistor and the second switching transistor in the switching circuit are electrically connected to one outputting wire, and the inputting terminal of the first switching transistor is electrically connected to the first outputting terminal of the pressure detecting unit corresponding to the switching circuit, and the inputting terminal of the second switching transistor is electrically connected to the second outputting terminal of the pressure detecting unit, and one of the shift registers electrically connected with the control terminal of the first switching transistor is different from one of the shift registers electrically connected with the control terminal of the second switching transistor. In this embodiment, the first outputting terminal and the second outputting terminal in one of the pressure detecting units electrically connected to the corresponding switching circuit may share one outputting wire. Therefore, the number of the outputting wires extended from the pressure detecting unit may be decreased, hence decreasing the area of the non-display region of the display panel occupied by the wirings of the pressure detecting unit, which is favorable to achieve the narrow frame.

Figure 7:
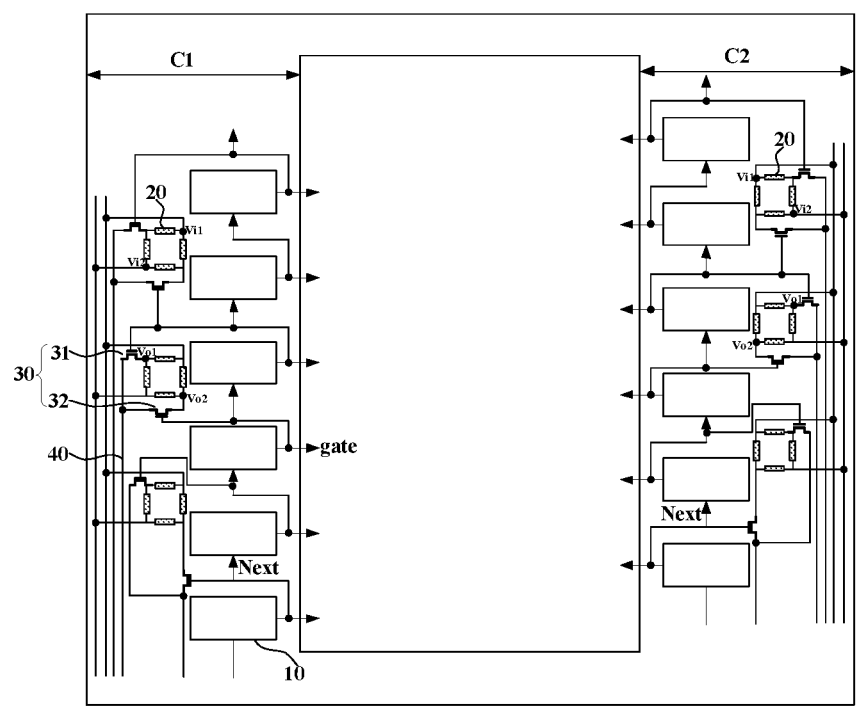
FIG. 7 is a diagram showing a display panel according to an embodiment of the present disclosure.

Referring to FIG. 7, FIG. 7 is a diagram showing a display panel according to an embodiment of the present disclosure. The difference between the display panel shown in FIG. 7 and the display panel above mentioned lies in that, the display panel shown in FIG. 7 includes: a first side C1 and a second side C2 provided opposite to the first side C1. Multiple shift registers 10 cascaded sequentially, a plurality of pressure detecting units 20, at least one switching circuit 30 and at least one outputting wire 40 are disposed on at least one of the first side C1 and the second side C2 of the display panel. The at least one outputting wire 40 is electrically connected to at least one switching circuit 30, the control terminals of any two of the switching transistors electrically connected to at least one outputting wire 40 are electrically connected to different shift registers 10. As shown in FIG. 7, the switching circuits 30 are disposed both on the first side C1 and the second side C2. It should be noted that, at least two of the switching transistors electrically connected to different outputting wires 40 may be electrically connected to the same shift register 10, so that the pressure detection signals may be outputted from the pressure detecting units 20 corresponding to different switching transistors via the different outputting wires 40 when the shift register 10 is configured to simultaneously control the plurality of switching transistors to be turned on. As shown in FIG. 2, the switching circuits 30 are disposed at the first side C1 or at the second side C2, which is not discussed again here. For example, if three pressure detecting units are disposed at a side of the display panel, six outputting wires are needed in the related art. However, only three outputting wires are needed in the display panel shown in FIG. 7.

In the display shown in FIG. 7, at least one switching circuit 30 is disposed at each of the first side C1 and the second side C2, the first outputting terminal Vo1 and the second outputting terminal Vo2 of one of the pressure detecting units 20 electrically connected to corresponding switching circuit 30 may share one outputting wire 40. Therefore, the number of the outputting wires extended from the pressure detecting unit 20 may be decreased, hence decreasing the area of the non-display region of the display panel occupied by the wirings of the pressure detecting unit 20, which is favorable to achieve the narrow frame of the first side C1 and the second side C2.

Figure 8:
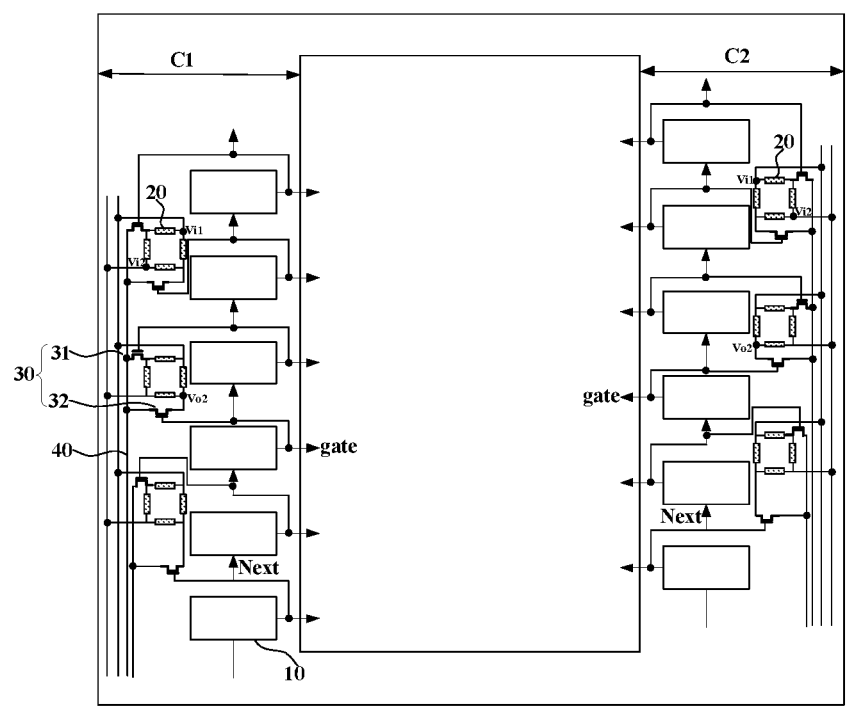
FIG. 8 is a diagram showing a display panel according to an embodiment of the present disclosure.

Referring to FIG. 8, FIG. 8 is a diagram showing a display panel according to an embodiment of the present disclosure. The difference between the display panel shown in FIG. 8 and the display panel shown in FIG. 7 lies in that, on the first side C1 of the display panel, an outputting wire 40 is electrically connected to a plurality of switching circuits 30; and/or, on the second side C2 of the display panel, an outputting wire 40 is electrically connected to a plurality of switching circuits 30. Since the control terminals of any two of the switching transistors electrically connected to one outputting wire 40 are electrically connected to different shift registers 10, the plurality of switching transistors which electrically connected to the one outputting wire 40 are turned on in a time-division manner, so that the pressure detection signals can be outputted in a time-division manner from the control terminals of the plurality of pressure detecting units 20 sharing one outputting wire 40. Therefore, the pressure detection signal of the pressure detecting unit 20 may be determined by the display panel based on the pressure detection signals outputted in a time-division manner by the outputting terminals of the pressure detecting unit 20. In such a way, the pressure detecting is performed and the narrow frame is achieved. For example, if three pressure detecting units are disposed at a side of the display panel, six outputting wires are needed in the related art. However, only two outputting wires are needed at one side of the display panel shown in FIG. 8.

Figure 9:
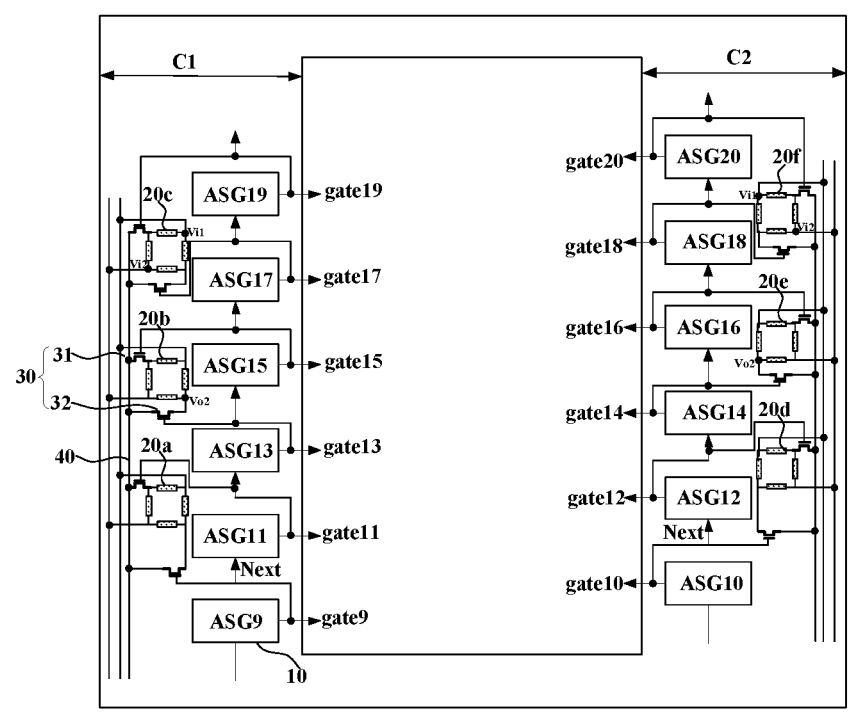
FIG. 9 is a diagram showing a display panel according to an embodiment of the present disclosure.

Referring to FIG. 9, FIG. 9 is a diagram showing a display panel according to an embodiment of the present disclosure. The difference between the display panel shown in FIG. 9 and any one of the display panels above mentioned lies in that, a plurality of the switching circuits 30 and one outputting wire 40 are disposed on the first side C1 of the display panel, and each of the plurality of switching circuits 30 is provided to correspond to one of the plurality of the pressure detecting units 20, respectively, and the outputting wire 40 is electrically connected to each of the corresponding switching circuits 30 disposed on the first side C1 of the display panel. Furthermore, a plurality of the switching circuits 30 and one outputting wire 40 are disposed on the second side C2 of the display panel, and each of the plurality of switching circuits 30 is provided to correspond to one of the plurality of the pressure detecting units 20, respectively, and the outputting wire 40 is electrically connected to each of the corresponding switching circuits 30 disposed on the second side C2 of the display panel.

As shown in FIG. 9, the multiple shift registers 10 cascaded with each other on the first side C1 of the display panel and the multiple shift registers 10 cascaded with each other on the second side C2 of the display panel are configured to alternately drive a plurality of scanning lines (not shown), and the plurality of scanning lines are represented as gate1, gate2, and gate3, . . . , etc., accordingly, the shift registers configured to drive corresponding scanning lines are represented as ASG1, ASG2, and ASG3, . . . , etc. Here, the multiple shift registers 10 cascaded with each other on the first side C1 of the display panel are represented as ASG1, ASG3, and ASG5, . . . , etc., and the multiple shift registers 10 cascaded with each other on the second side C2 of the display panel are represented as ASG2, ASG4, and ASG6, . . . , etc.

Here, three pressure detecting units are disposed on the first side C1 of the display panel, which are represented as 20a, 20b, and 20c, respectively. The shift register ASG9 and the shift register ASG 11 are reused as a control component of the switching circuit 30 corresponding to the pressure detecting unit 20a, and the shift register ASG13 and the shift register ASG 15 are reused as a control component of the switching circuit 30 corresponding to the pressure detecting unit 20b, and the shift register ASG17 and the shift register ASG 19 are reused as a control component of the switching circuit 30 corresponding to the pressure detecting unit 20c.

Here, three pressure detecting units are disposed on the second side C2 of the display panel, which are represented as 20d, 20e, and 20f, respectively. The shift register ASG10 and the shift register ASG 12 are reused as a control component of the switching circuit 30 corresponding to the pressure detecting unit 20d, and the shift register ASG14 and the shift register ASG 16 are reused as a control component of the switching circuit 30 corresponding to the pressure detecting unit 20e, and the shift register ASG18 and the shift register ASG 20 are reused as a control component of the switching circuit 30 corresponding to the pressure detecting unit 20f.

Figure 10:
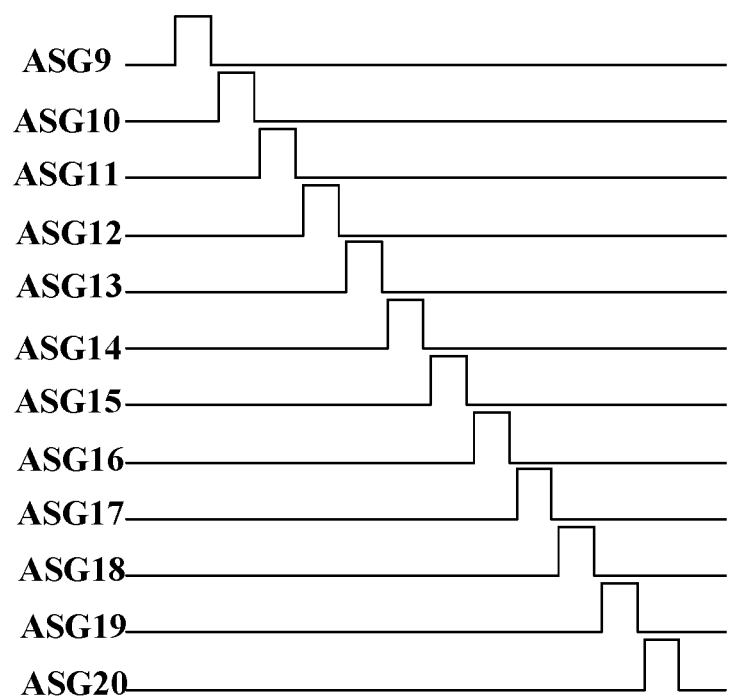
FIG. 10 is a diagram showing a driving structure for the display panel shown in FIG. 9.

FIG. 10 is a diagram showing the driving structure of the display panel shown in FIG. 9. The timing for the shift registers ASG9 to ASG20 are shown in FIG. 10. Apparently, the high level pulse signals sequentially outputted from the shift registers ASG 9 to ASG20 are configured to drive corresponding scanning lines. Based on this, specifically, when a signal outputted from the outputting terminal of the shift register ASG9 is a high level pulse signal, the second switching transistor 32 of the switching circuit 30 corresponding to the pressure detecting unit 20a is turned on, and the voltage of the second outputting terminal Vo2 of the pressure detecting unit 20a may be acquired by the drive IC via an outputting wire 40 disposed on the first side C1 of the display panel;

when a signal outputted from the outputting terminal of the shift register ASG10 is a high level pulse signal, the second switching transistor 32 of the switching circuit 30 corresponding to the pressure detecting unit 20d is turned on, and the voltage of the second outputting terminal Vo2 of the pressure detecting unit 20d may be acquired by the drive IC via an outputting wire 40 disposed on the second side C2 of the display panel;

when a signal outputted from the outputting terminal of the shift register ASG11 is a high level pulse signal, the first switching transistor 31 of the switching circuit 30 corresponding to the pressure detecting unit 20a is turned on, and the voltage of the first outputting terminal Vo1 of the pressure detecting unit 20a may be acquired by the drive IC via the outputting wire 40 disposed on the first side C1 of the display panel, and at this time, the voltage of the first outputting terminal Vo1 and the voltage of the second outputting terminal Vo2 in the pressure detecting unit 20a are both acquired in a time-division manner by the drive IC, so that the pressure value of the pressure detecting unit 20a may be calculated by the drive IC through a computing process so as to achieve the pressure detecting function;

when a signal outputted from the outputting terminal of the shift register ASG12 is a high level pulse signal, the first switching transistor 31 of the switching circuit 30 corresponding to the pressure detecting unit 20d is turned on, and the voltage of the first outputting terminal Vo1 of the pressure detecting unit 20d may be acquired by the drive IC via the outputting wire 40 disposed on the second side C2 of the display panel, and at this time, the voltage of the first outputting terminal Vo1 and the voltage of the second outputting terminal Vo2 in the pressure detecting unit 20d are acquired in a time-division manner by the drive IC, so that the pressure value of the pressure detecting unit 20d may be calculated by the drive IC through a computing process so as to achieve the pressure detecting function.

The remaining shift registers can be done in the above same manner. By sequentially outputting from the shift registers 10 stage by stage, the pressure detection signal of each of the pressure detecting units may be outputted in a time-division manner via a shared outputting line. The narrow frame and the reduction on the number of the inputting terminals of the drive IC for receiving the pressure detection signal are achieved without affecting the pressure detecting function.

Since the control terminals of the plurality of the switching transistors 10 on the first side C1 are electrically connected to one outputting wire 40 via corresponding switching transistors, any two of the switching transistors on the first side C1 of the display panel are electrically connected to different shift registers 10, so that the switching transistors on the first side C1 of the display panel may be turned on in a time-division manner, which enables the pressure signals to be outputted in a time-division manner from outputting terminals of the pressure detecting units 20. Therefore, the pressure detection signal of the pressure detecting unit 20 may be determined by the display panel based on the pressure detection signals outputted in a time-division manner from two outputting terminals of the pressure detecting units 20. In such a way, the pressure detecting is performed and the narrow frame is achieved. For example, if three pressure detecting units are disposed at a side of the display panel, six outputting wires are needed in the related art. However, only one outputting wire is needed at a side of the display panel shown in FIG. 9.

For any one of above mentioned display panels, the signal outputted from the outputting terminal of the shift register 10 is a pulse signal. When the high level pulse signal acts as an effective pulse signal and the pulse signal outputted from at least one of the shift registers 10 is reused as a control signal to control turning on and turning off of the switching transistors, each of the first switching transistor 31 and the second switching transistor 32 in the switching circuit 30 may be a NMOS. When the low level pulse signal acts as an effective pulse signal and the pulse signal outputted from at least one of the shift registers 10 is reused as a control signal to control turning on and turning off of the switching transistors, each of the first switching transistor 31 and the second switching transistor 32 in the switching circuit 30 may be a PMOS.

For the display panels shown in FIG. 2 to FIG. 8, in the arrangement that an outputting wire 40 is electrically connected to only one of switching circuits 30, and for this switching circuit 30, the control terminal of the first switching transistor 31 and the control terminal of the second switching transistor 32 in the switching circuit 30 are electrically connected to one shift register 10. Accordingly, the first switching transistor 31 of the switching circuit 30 is a NMOS and the second switching transistor 32 of the switching circuit 30 is a PMOS. The shift register 10 is configured to simultaneously control the first switching transistor 31 of the switching circuit 30 to be turned on and control the second switching transistor 32 of the switching circuit 30 to be turned off. Base on a time-division manner, in a different time, the shift register 10 is configured to simultaneously control the first switching transistor 31 of the switching circuit 30 to be turned off and control the second switching transistor 32 of the switching circuit 30 to be turned on. Therefore, the signal of the first outputting terminal Vo1 and the signal of the second outputting terminal Vo2 in the pressure detecting unit 20 are outputted in a time-division manner by the switching circuit 30 via one outputting wire 40, which is favorable for the drive IC to perform the pressure detecting function.

Figure 11:
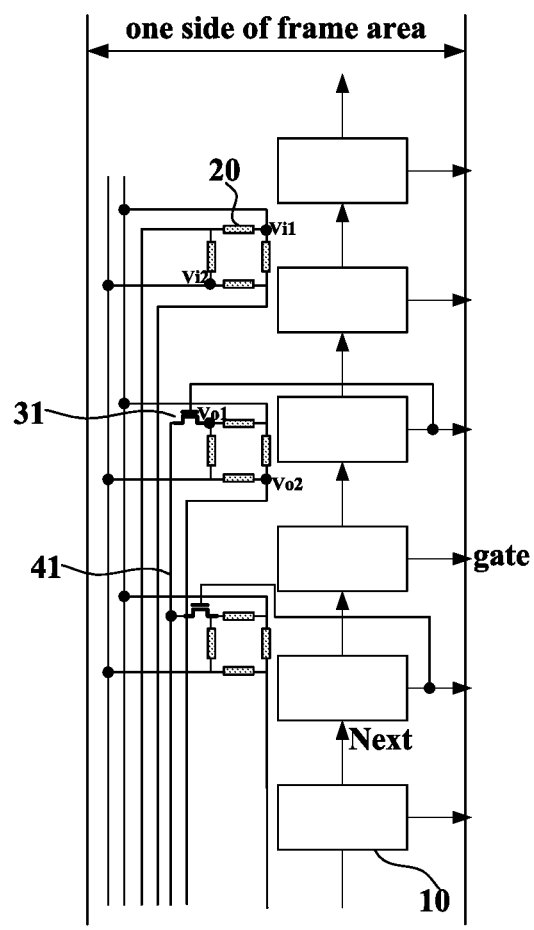
FIG. 11 is a diagram showing a display panel according to an embodiment of the present disclosure.

Referring to FIG. 11, FIG. 11 is a diagram showing a display panel according to an embodiment of the present disclosure. The display panel provided by this embodiment includes: multiple shift registers 10 cascaded with each other, a plurality of pressure detecting units 20 and at least two switching circuits. Each of the switching circuits 30 is electrically connected to corresponding one of pressure detecting units 20. The switching circuit 30 includes a first switching transistor 31. A control terminal of the first switching transistor 31 is electrically connected with an outputting terminal of one of the shift registers 10. An inputting terminal of the first switching transistor 31 is electrically connected to a first outputting terminal Vo1 of the corresponding pressure detecting unit 20. The outputting terminals of at least two of the first switching transistors 31 are electrically connected to one first outputting wire 41. The control terminals of two of the first switching transistors 31 electrically connected to the first outputting wire 41 are electrically connected to different shift registers 10. Only one side of the frame region of the display panel are shown herein (that is, a part of the non-display region) and the region of the display panel are not completely shown.

In this embodiment, the switching circuit 30 includes a first switching transistor 31. The display panel includes at least two switching circuits. The outputting terminals of at least two of the first switching transistors 31 are electrically connected to one first outputting wire 41, and the control terminals of any two of the first switching transistors 31 electrically connected to the first outputting wire 41 are electrically connected to different shift registers 10, so that one of the shift registers 10 electrically connected to the first switching transistor 31 is reused as a control component to control turning on and turning off of the first switching transistor 31. The outputting terminal of the shift register 10 is configured to output a trigger signal next for the next stage of shift register, a scan drive signal gate or a light-emitting control signal. In this embodiment, the scan drive signal gate outputted by the shift register 10 is reused as a control signal of the first switching transistor 31.

An inputting terminal of the first switching transistor 31 is electrically connected to a first outputting terminal Vo1 of the corresponding pressure detecting unit 20. When a signal outputted by the outputting terminal of the one of the shift registers 10 electrically connected to the first switching transistor 31 controls turning on of the first switching transistor 31, a pressure detection signal outputted from the first outputting terminal Vo1 of the pressure detecting unit 20 can be transmitted to an outputting wire 41 through the turned-on first switching transistor 31, and hence transmitted to a drive IC (not shown). When a signal outputted by the outputting terminal of one of the shift registers 10 electrically connected to the first switching transistor 31 controls turning off of the first switching transistor 31, a pressure detection signal outputted from the first outputting terminal Vo1 of the pressure detecting unit 20 cannot be transmitted to the outputting wire 41.

In this embodiment, the outputting terminals of the first switching transistors 31 in at least two switching circuits are electrically connected to one first outputting wire 41. For two of the first switching transistors 31 electrically connected to one first outputting wire 41, one of the shift registers 10 electrically connected to the control terminal of one of the first switching transistors 31 is different from one of the shift registers 10 electrically connected to the control terminal of the other of the first switching transistors 31 so that at least two different shift registers 10 can control at least two of the first switching transistors 31 to be turned on in a time-division manner, and hence the pressure detection signals outputted from the first outputting terminals Vo1 of at least two pressure detecting units 20 can be transmitted to the drive IC in a time-division manner.

In this embodiment, the first outputting terminals of at least two pressure detecting units 20 may share one first outputting wire 41. Therefore, the number of the outputting wires extended from the pressure detecting unit may be decreased, thereby decreasing the area of the non-display region of the display panel occupied by the wirings of the pressure detecting unit, which is favorable to achieve the narrow frame.

For example, if three pressure detecting units are disposed at a side of the display panel, then six outputting wires are needed in the related art, however, only five outputting wires are needed at a side of the display panel as shown in FIG. 11.

For example, if eight pressure detecting units are disposed at a side of the display panel, then sixteen outputting wires are needed in the related art. However, with this embodiment, specifically, the first outputting terminals of adjacent four pressure detecting units may share one first outputting wire, so that only ten outputting wires are needed at one side of the display panel, and the ten outputting wires include two first outputting wires and eight outputting wires extended from the second outputting terminals of the pressure detecting units.

Figure 12:
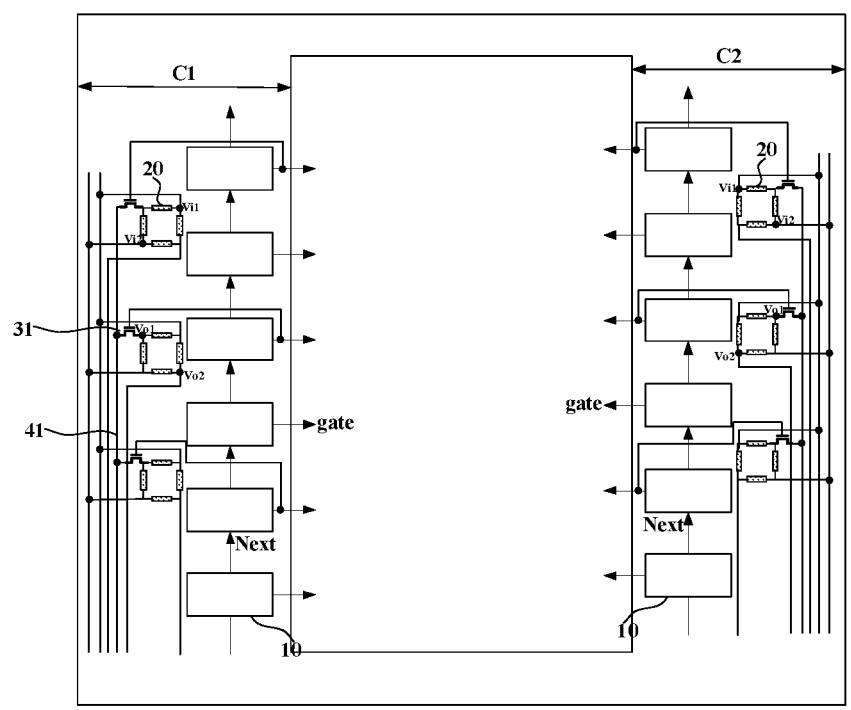
FIG. 12 is a diagram showing a display panel according to an embodiment of the present disclosure.

Referring to FIG. 12, FIG. 12 is a diagram showing a display panel according to an embodiment of the present disclosure. The differences between the display panel shown in FIG. 12 and the display panel above mentioned lies in that, the display panel shown in FIG. 12 includes: a first side C1 and a second side C2 provided opposite to the first side C1; multiple shift registers 10 cascaded with each other, a plurality of pressure detecting units 20, a plurality of switching circuits and one first outputting wire 41 are disposed on at least one of the first side C1 and the second side C2 of the display panel, and each of outputting terminals of first switching transistors 31 of the switching circuits is electrically connected to the one first outputting wire 41.

For the display panel shown in FIG. 12, the first outputting terminals Vo1 of the pressure detecting units 20 on the first side C1 share one first outputting wire 41, and the first outputting terminals Vo1 of the pressure detecting units 20 on the second side C2 share one first outputting wire 41.

Therefore, the number of the outputting wires extended from the pressure detecting unit 20 may be decreased, thereby decreasing the area of the non-display region of the display panel occupied by the wirings of the pressure detecting unit 20, which is favorable to achieve the narrow frame both on the first side C1 and the second side C2 in the display panel.

For example, if three pressure detecting units are disposed at a side of the display panel, six outputting wires are needed in the related art. However, only four outputting wires are needed at a side of the display panel as shown in FIG. 12.

Figure 13:
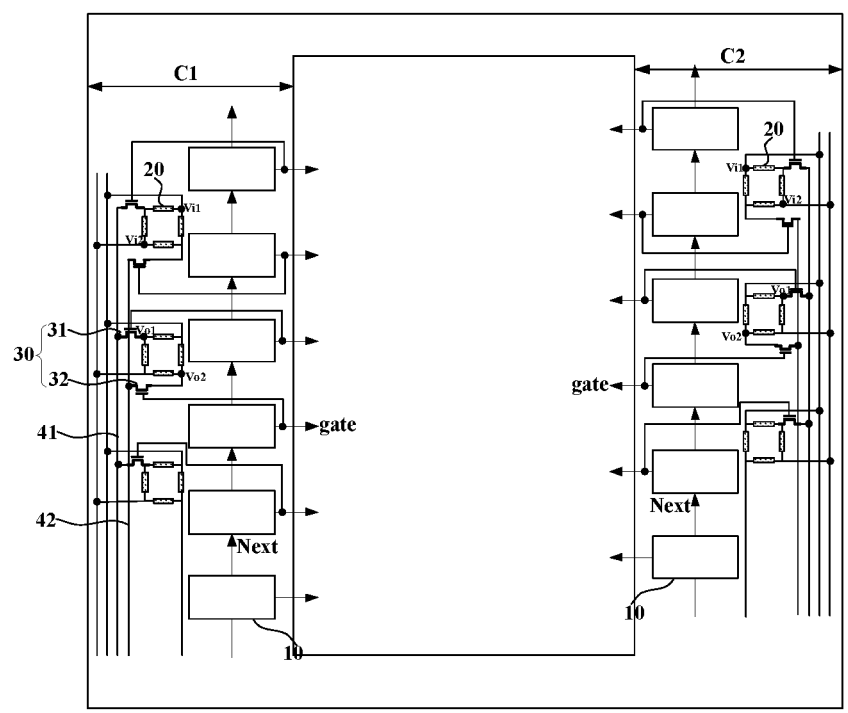
FIG. 13 is a diagram showing a display panel according to an embodiment of the present disclosure.

Referring to FIG. 13, FIG. 13 is a diagram showing a display panel according to an embodiment of the present disclosure. The differences between the display panel shown in FIG. 13 and the display panels shown in FIG. 11 and FIG. 12 lies in that, for the display panel shown in FIG. 13, the switching circuit 30 further includes a second switching transistor 32, a control terminal of the second switching transistor 32 is electrically connected to an outputting terminal of one of the shift registers 10 and an inputting terminal of the second switching transistor 32 is electrically connected to a second outputting terminal Vo2 of the corresponding pressure detecting unit 20, the outputting terminals of at least two of the second switching transistors 32 are electrically connected to one second outputting wire 42, for any two of the second switching transistors 32 electrically connected to one second outputting wire 42, one of the shift registers electrically connected to the control terminal of one of the second switching transistors 32 is different from one of the shift registers electrically connected to the control terminal of the other of the second switching transistors 32.

In the display shown in FIG. 13, the first outputting terminals Vo1 of at least two pressure detecting units 20 on the first side C1 share one first outputting wire 41, the second outputting terminals Vo2 of at least two pressure detecting units 20 on the first side C1 share one second outputting wire 42. The first outputting terminals Vo1 of at least two pressure detecting units 20 on the second side C2 share one first outputting wire 41, and the second outputting terminals Vo2 of at least two pressure detecting units 20 on the second side C2 share one second outputting wire 42. Therefore, the number of the outputting wires extended from the pressure detecting unit 20 may be decreased, thereby decreasing the area of the non-display region of the display panel occupied by the wirings of the pressure detecting unit 20, which is favorable to achieve the narrow frame both on the first side C1 and the second side C2 of the display panel.

For example, if three pressure detecting units are disposed at a side of the display panel, six outputting wires are needed in the related art. However, only three outputting wires are needed at a side of the display panel as shown in FIG. 13.

Figure 14:
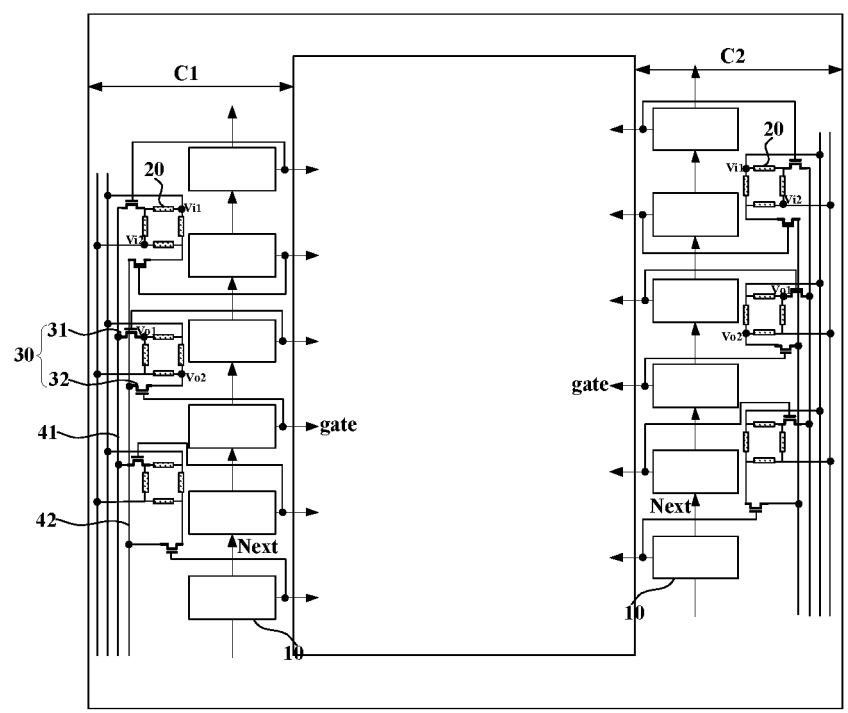
FIG. 14 is a diagram showing a display panel according to an embodiment of the present disclosure.

Referring to FIG. 14, FIG. 14 is a diagram showing a display panel according to an embodiment of the present disclosure. The differences between the display panel shown in FIG. 14 and the above-mentioned display panel lies in that, the display panel shown in FIG. 14 includes: a first side C1 and a second side C2 provided opposite to the first side C1; multiple shift registers 10 cascaded with each other, a plurality of pressure detecting units 20, a plurality of switching circuits 30 and one second outputting wires 42 are disposed on at least one of the first side C1 and the second side C2 of the display panel, and each of the control terminals of the second switch transistor 32 in the switching circuits 30 is electrically connected to the second outputting wire 42.

In the display panel shown in FIG. 14, the first outputting terminals Vo1 of the pressure detecting units 20 on the first side C1 share one first outputting wire 41, the second outputting terminals Vo2 of the pressure detecting units 20 on the first side C1 share one second outputting wire 42. Therefore, at the first side C1 of the display panel, minimally two inputting wires and two outputting wires may be used to electrically connect to the pressure detecting units 20 disposed on the first side C1, in order to perform the pressure detection. The first outputting terminals Vo1 of the pressure detecting units 20 on the second side C2 share one first outputting wire 41, the second outputting terminals Vo2 of the pressure detecting units 20 on the second side C2 share one second outputting wire 42. Therefore, at the second side C2 of the display panel, minimally two inputting wires and two outputting wires may be used to electrically connect to the pressure detecting units 20 disposed on the second side C2, in order to perform the pressure detection.

Apparently, for the display panel provided in this embodiment, the number of the outputting wires extended from the pressure detecting units of the non-display region may be considerably decreased, thereby decreasing the area of the non-display region of the display panel occupied by the wirings of the pressure detecting unit, which is favorable to achieve the narrow frame both on the first side C1 and the second side C2 of the display panel.

For example, if three pressure detecting units are disposed at a side of the display panel, six outputting wires are needed in the related art. However, only two outputting wires are needed at a side of the display panel as shown in FIG. 14.

For any one of above mentioned display panels, the signal outputted by the outputting terminal of the shift register 10 is a pulse signal. When the high level pulse signal acts as an effective pulse signal and the pulse signal outputted from at least one of the shift registers 10 is reused as a control signal to control turning on and turning off of the switching transistors, each of the first switching transistor 31 and the second switching transistor 32 in the switching circuit 30 may be an NMOS. When the low level pulse signal acts as an effective pulse signal and the pulse signal outputted from at least one of the shift registers 10 is reused as a control signal to control turning on and turning off of the switching transistors, each of the first switching transistor 31 and the second switching transistor 32 in the switching circuit 30 may be a PMOS.

Figure 15:
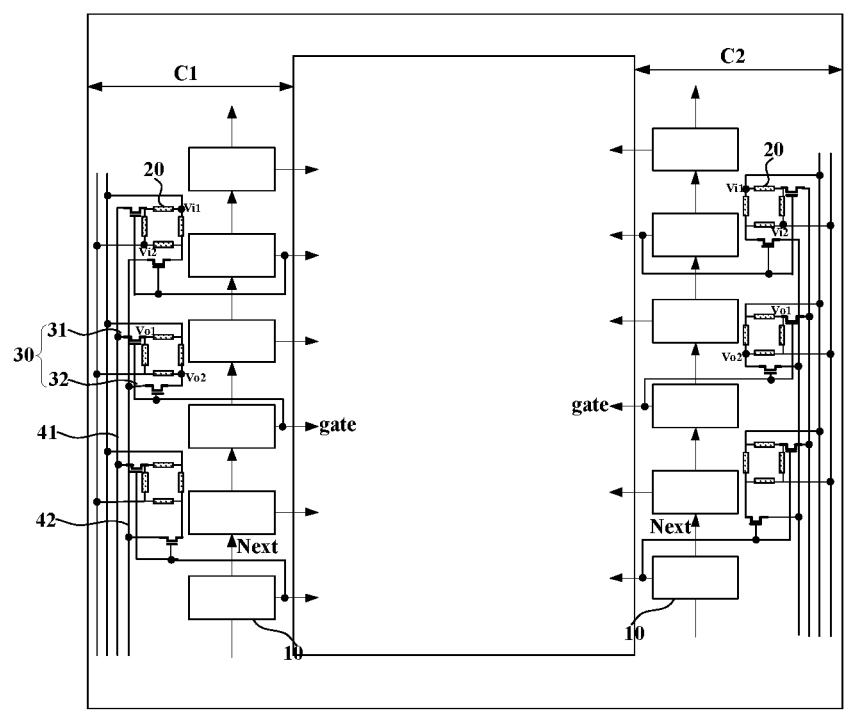
FIG. 15 is a diagram showing a display panel according to an embodiment of the present disclosure.

Referring to FIG. 15, FIG. 15 is a diagram showing a display panel according to an embodiment of the present disclosure. The differences between the display panel shown in FIG. 15 and the display panels shown in FIG. 11 to FIG. 14 lies in that, for the display panel shown in FIG. 15, the control terminal of the first switching transistor 31 and the control terminal of the second switching transistor 32 in one of the switching circuits 30 are electrically connected to the same shift register 10, that is, each of the switching circuits 30 is electrically connected to one of the shift registers 10. The first switching transistor 31 and the second switching transistor 32 in one of the switching circuits 30 are electrically connected to different outputting wires, so that the switching circuit 30 is electrically connected to one of the shift registers 10. That is, the control terminal of the first switching transistor 31 and the control terminal of the second switching transistor 32 in one of the switching circuits 30 are electrically connected to one of the shift registers 10, and hence the shift register 10 can simultaneously control the control terminal of the first switching transistor 31 and the control terminal of the second switching transistor 32 in the switching circuit 30, so that a pressure detection signal may be outputted from the first outputting terminal Vo1 of the pressure detecting unit 20 via the first outputting wire 41, and a pressure detection signal may be outputted from the second outputting terminal Vo2 of the pressure detecting unit 20 via the second outputting wire 42. Here, the signal outputted from the outputting terminal of the shift register 10 may be a pulse signal and a high level pulse signal is defined as an effective pulse signal. In this arrangement, each of the first switching transistor 31 and the second switching transistor 32 in the switching circuit 30 is an NMOS.

It should be noted that, the same part between the display panels shown in FIG. 11 to FIG. 15 and the display panels shown in FIG. 2 to FIG. 9 are not repeated here, and only different structures are described below in a detail.

The present disclosure further provides an electronic device, where the electronic device includes the display panel according to any one of the embodiments mentioned above. The display panel may be a liquid-crystal display panel or an organic light-emitting display panel, and the types thereof are not limited in the present disclosure, and any one type thereof may fall into the scope of protection in the present disclosure.

A display panel of the electronic device provided by the present disclosure may achieve a narrow frame. Specifically, the switching transistors are provided at the first outputting terminal and/or the second outputting terminal of the pressure detecting unit, and the shift register is reused as a control component to control the switching transistors, and hence the first outputting terminal and the second outputting terminal in the pressure detecting unit share one outputting wire, so that the pressure detection signals may be outputted in a time-division manner from the first outputting terminal and the second outputting terminal in the pressure detecting unit; or, the first outputting terminals of a plurality of pressure detecting units share one outputting wire, so that the pressure detection signals may be outputted in a time-division manner from the first outputting terminals of the pressure detecting units; or, the second outputting terminals of a plurality of pressure detecting units share one outputting wire, so that the pressure detection signals may be outputted in a time-division manner from the second outputting terminals of the pressure detecting units. For any one of the pressure detecting units electrically connected to the switching circuits, the voltage of the first outputting terminal Vo1 and the voltage of the second outputting terminal Vo2 in the pressure detecting unit are acquired in a time-division manner by the drive IC. Hence, the pressure value of the pressure detecting unit may be obtained via the computing process so as to achieve the pressure detecting function.

The display panel of the electronic device provided by the present disclosure employs an output signal of the shift register as a control signal to control the switching transistor of the switching circuit. Since the shift registers can be sequentially outputted stage by stage, the plurality of switching transistors sharing one outputting wire can be sequentially turned on, and hence the pressure detection signals can be sequential outputted in a time-division manner. Further, the first switching transistor and the second switching transistor in the switching circuit and the switching transistors of the shift register may be disposed in the same layer or may be manufactured simultaneously, and hence the number of manufacture processes and the complexity of the processes are not increased, and also the thickness of the display panel is not increased.

The display panel of the electronic device provided in the present disclosure may decrease the number of outputting wires of the pressure detecting unit and achieve the narrow frame. Further, the number of the terminals of the drive IC connected to outputting wires of the pressure detecting unit is decreased and hence the production cost of the drive IC is reduced.

It should be noted that the above contents are only preferred embodiments of the present disclosure and its technical principles. It can be understood for those skilled in the art that the present disclosure is not limited to specific embodiments described herein. For those skilled in the art, the present disclosure can be subject to various apparent variations, readjustments and replacements without departing from a protection scope of the present disclosure. Therefore, although the present disclosure is described in detail through above embodiments, the present disclosure is not only limited to above embodiments. The present disclosure can also include more equivalent embodiments without deviating from conceptions of the present disclosure. A scope of the present disclosure is determined by a scope of attached claims.

What is claimed is:

1. A display panel, comprising:
multiple shift registers cascaded sequentially;
a plurality of pressure detecting units; and
at least one switching circuit and at least one outputting wire, wherein each of the at least one switching circuit is electrically connected to a respective one of the pressure detecting units;
wherein each of the at least one switching circuit comprises a first switching transistor and a second switching transistor, wherein a control terminal of the first switching transistor is electrically connected to an outputting terminal of one of the shift registers, wherein a control terminal of the second switching transistor is electrically connected to an outputting terminal of another one of the shift registers, and an inputting terminal of the first switching transistor and an inputting terminal of the second switching transistor both are electrically connected to a same pressure detecting unit,
wherein the inputting terminal of the first switching transistor is electrically connected to a first outputting terminal of the same pressure detecting unit, the inputting terminal of the second switching transistor is electrically connected to a second outputting terminal of the same pressure detecting unit, and the outputting terminal of the first switching transistor and the outputting terminal of the second switching transistor in the at least one switching circuit are electrically connected to a same outputting wire, so that the same outputting wire is shared by the first outputting terminal and the second outputting terminal of the same pressure detecting unit, and
wherein one of the shift registers electrically connected with the control terminal of the first switching transistor is different from the other shift register electrically connected with the control terminal of the second switching transistor.

2. The display panel according to claim 1, wherein each of the at least one switching circuit has a one to one relationship to one of the plurality of pressure detecting units.

3. The display panel according to claim 1, wherein the display panel comprises:
a first side and a second side provided opposite to the first side;
wherein the multiple shift registers cascaded sequentially; wherein the plurality of pressure detecting units, the at least one switching circuit and the at least one outputting wire are disposed on at least one of the first side and the second side of the display panel,
wherein one of the at least one outputting wire is electrically connected to the at least one switching circuit, and
for a first and a second switching transistors electrically connected to one of the at least one outputting wires, the shift registers electrically connected to the control terminal of the first switching transistor are different from the shift registers electrically connected to the control terminal of the second switching transistors.

4. The display panel according to claim 3, wherein
the at least one switching circuit and one of the at least one outputting wire are disposed at the first side of the display panel, and each of the at least one switching circuit is provided to correspond to one of the plurality of the pressure detecting units, respectively, and the at least one outputting wire is electrically connected to each of the corresponding switching circuits disposed at the first side of the display panel; and wherein
the at least one switching circuit and one of the at least one outputting wire are disposed at the second side of the display panel, and the at least one switching circuit is provided to correspond to the plurality of the pressure detecting units, respectively, and the at least one outputting wire is electrically connected to each of the corresponding switching circuits disposed at the second side of the display panel.

5. The display panel according to claim 1, wherein
for each of the at least one switching circuit, one of the shift registers electrically connected to the first switching transistor of the switching circuit is cascaded with one of the shift registers electrically connected to the second switching transistor of the switching circuit.

6. The display panel according to claim 1, wherein
the outputting terminal of one of the shift registers is configured to output one of: a trigger signal for the next stage of shift register, a scan drive signal and a light-emitting control signal.

7. A display panel, comprising:
multiple shift registers cascaded sequentially;
a plurality of pressure detecting units; and
at least two switching circuits and at least one first outputting wire, wherein each of the at least two switching circuits is electrically connected to a respective one pressure detecting unit of the plurality of pressure detecting units;
wherein each of the at least two switching circuits comprises a first switching transistor and a second switching transistor, wherein a control terminal of the first switching transistor is electrically connected with an outputting terminal of one of the shift registers and a control terminal of the second switching transistor is electrically connected with an outputting terminal of another one of the shift registers, wherein an inputting terminal of the first switching transistor is electrically connected to a first outputting terminal of the respective one pressure detecting unit, an inputting terminal of the second switching transistor is electrically connected to a second outputting terminal of the respective one pressure detecting unit, and outputting terminals of the first switching transistor and the second switching transistor are electrically connected to a same first outputting wire, and
wherein for the first switching transistor and the second switching transistor electrically connected to the same first outputting wire, the shift register electrically connected to the control terminal of the first switching transistor is different from the other shift register electrically connected to the control terminal of the second switching transistor.

8. The display panel according to claim 7, wherein the display panel comprises:
a first side and a second side which configured to be opposite to the first side;
wherein the multiple shift registers cascaded sequentially, the plurality of pressure detecting units, the at least two switching circuits and one of the at least one first outputting wire are disposed on at least one of: the first side and the second side of the display panel, and
each outputting terminal of first switching transistors of the at least two switching circuits is electrically connected to one of the at least one first outputting wire.

9. The display panel according to claim 7, wherein the display panel further comprises:
a first side and a second side configured to be opposite to the first side;
wherein the multiple shift registers cascaded sequentially, wherein the plurality of pressure detecting units, the at least two switching circuits and one of the second outputting wires are disposed on at least one of the first side and the second side of the display panel, and
wherein each outputting terminal of second switching transistors of the at least two switching circuits is electrically connected to one of the second outputting wires.

10. The display panel according to claim 7, wherein the control terminal of the first switching transistor and the control terminal of the second switching transistor of the at least two switching circuits are electrically connected to one of the shift registers.

11. An electronic device, comprising a display panel, wherein
the display panel comprises:
multiple shift registers cascaded sequentially;
a plurality of pressure detecting units; and
at least one switching circuit and at least one outputting wire, wherein each of the at least one switching circuit is electrically connected to a respective one of the pressure detecting units;
wherein each of the at least one switching circuit comprises a first switching transistor and a second switching transistor, wherein a control terminal of the first switching transistor is electrically connected to an outputting terminal of one of the shift registers, wherein a control terminal of the second switching transistor is electrically connected to an outputting terminal of another one of the shift registers, and an inputting terminal of the first switching transistor and an inputting terminal of the second switching transistor both are electrically connected to a same pressure detecting unit, wherein the inputting terminal of the first switching transistor is electrically connected to a first outputting terminal of the same pressure detecting unit, the inputting terminal of the second switching transistor is electrically connected to a second outputting terminal of the same pressure detecting unit, and the outputting terminal of the first switching transistor and the outputting terminal of the second switching transistor in the at least one switching circuit are electrically connected to a same outputting wire, so that the same outputting wire is shared by the first outputting terminal and the second outputting terminal of the same pressure detecting unit, and wherein one of the shift registers electrically connected with the control terminal of the first switching transistor is different from the other shift register electrically connected with the control terminal of the second switching transistor.

12. The electronic device according to claim 11, wherein each of the at least one switching circuit has a one to one relationship to one of the plurality of pressure detecting units.

13. The electronic device according to claim 11, wherein the display panel comprises:
a first side and a second side provided opposite to the first side; wherein the multiple shift registers cascaded sequentially, wherein the plurality of pressure detecting units, the at least one switching circuit and the at least one outputting wire are disposed on at least one of the first side and the second side of the display panel;
wherein one of the at least one outputting wire is electrically connected to the at least one switching circuit, and for a first and a second switching transistors electrically connected to one of the at least one outputting wire, the shift register electrically connected to the control terminal of the first switching transistor is different from the shift register electrically connected to the control terminal of the second switching transistor.

14. The electronic device according to claim 11, wherein for each of the at least one switching circuit, one of the shift registers electrically connected to the first switching transistor of the switching circuit is cascaded with one of the shift registers electrically connected to the second switching transistor of the switching circuit.

15. The electronic device according to claim 11, wherein the outputting terminal of one of the shift registers is configured to output one of: a trigger signal for the next stage of shift register, a scan drive signal and a light-emitting control signal.

* * * * *